(12) United States Patent
Inoue et al.

(10) Patent No.: US 9,197,038 B1
(45) Date of Patent: Nov. 24, 2015

(54) SPARK PLUG AND METHOD OF MANUFACTURING THE SAME

(71) Applicant: NGK SPARK PLUG CO., LTD., Nagoya-shi, Aichi (JP)

(72) Inventors: Masahiro Inoue, Gifu (JP); Kenji Moritani, Konan (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 14/726,766

(22) Filed: Jun. 1, 2015

(30) Foreign Application Priority Data

Jun. 4, 2014 (JP) .................................. 2014-115562

(51) Int. Cl.
*H01T 13/32* (2006.01)
*H01T 21/02* (2006.01)
*B23K 11/00* (2006.01)

(52) U.S. Cl.
CPC .............. *H01T 13/32* (2013.01); *B23K 11/002* (2013.01); *H01T 21/02* (2013.01)

(58) Field of Classification Search
CPC ......... H01T 13/20; H01T 13/32; H01T 13/39; H01T 13/02; H01T 21/00; H01T 21/02
See application file for complete search history.

(56) References Cited

U.S. PATENT DOCUMENTS

| 8,810,116 | B2 * | 8/2014 | Kasuya | H01T 13/32 313/141 |
| 2001/0025617 | A1 * | 10/2001 | Kanao | H01T 21/02 123/169 EL |
| 2004/0041506 | A1 * | 3/2004 | Teramura | H01T 21/02 313/141 |
| 2012/0001533 | A1 * | 1/2012 | Sakayanagi | H01T 21/02 313/141 |
| 2015/0130345 | A1 * | 5/2015 | Sakakura | H01T 21/02 313/141 |

FOREIGN PATENT DOCUMENTS

| JP | 2003-229231 A | 8/2003 | ............. H01T 21/02 |
| JP | WO 2010058835 A1 * | 5/2010 | ............. H01T 13/32 |
| JP | WO 2010113433 A1 * | 10/2010 | ............. H01T 13/39 |
| JP | EP 2704271 A2 * | 3/2014 | ............. H01T 13/32 |
| JP | WO 2014103461 A1 * | 7/2014 | ............. H01T 13/39 |

* cited by examiner

*Primary Examiner* — Mariceli Santiago
(74) *Attorney, Agent, or Firm* — Kusner & Jaffe

(57) ABSTRACT

A spark plug including a ground electrode body and an electrode tip that is resistance welded to the ground electrode body and that has a discharge surface. In a specific sectional plane, a welding surface is located in the first direction from an outer surface of the ground electrode body. The welding surface includes a flat portion whose distance to the point P1 in the first direction is 0.05 mm or smaller, and when a point E1 and a point E2 are defined as ends of the flat portion and a second direction is defined as a direction from the point E2 toward the point E1, in the second direction from the point E1, a distance between the welding surface and the discharge surface in the first direction is smaller than a distance between the discharge surface and the point E1 in the first direction.

4 Claims, 8 Drawing Sheets

SECTIONAL PLANE CS

SECTIONAL PLANE CTS

SPARK PLUG AND METHOD OF MANUFACTURING THE SAME

RELATED APPLICATIONS

This application claims the benefit of Japanese Patent Application No. 2014-115562, filed Jun. 4, 2014, the entire content of which is hereby incorporated by reference.

FIELD OF THE INVENTION

The present invention relates to a spark plug that is used for ignition of an internal combustion engine or the like and a method of making the spark plug.

BACKGROUND OF THE INVENTION

A spark plug causes a spark discharge at a gap between a distal end of a center electrode and a distal end of a ground electrode when a voltage is applied to the center electrode and the ground electrode, which are insulated from each other by an insulator. There is a known technology in which an electrode tip that is made of a noble metal or the like, which has good antiwear properties, is used to improve the durability of an electrode (for example, Japanese Unexamined Patent Application Publication No. 2003-229231). In the technology described in Japanese Unexamined Patent Application Publication No. 2003-229231, a ground electrode tip is resistance welded to a ground electrode body, which is made of a nickel alloy.

However, with the technology described above, there is a possibility that the strength of a resistance weld may decrease due to an irregularity in the pressure between the electrode tip and the electrode body during resistance welding. As a result, there is a possibility that peeling of an electrode tip may occur more easily and the durability of the spark plug may decrease.

An advantage of the present invention is to suppress peeling of electrode tips and improve spark plug durability.

SUMMARY OF THE INVENTION

The present invention, which has been made in order to resolve at least part of the above problem, can be realized as the following application examples.

Application Example 1

In accordance with a first aspect of the present invention, there is provided a spark plug including: a center electrode, a ground electrode body, and an electrode tip that is resistance welded to the ground electrode body and that has a discharge surface that forms a gap between the discharge surface and the center electrode, in which, in a specific sectional plane, which is one of sectional planes that perpendicularly cut the discharge surface and which cuts the discharge surface so that a linear length of the discharge surface is largest, when a first direction is defined as a direction that is perpendicular to the discharge surface and in which the ground electrode body is located as viewed from the discharge surface and a point P1 is defined as one of points on a welding surface of the electrode tip where the electrode tip is welded to the ground electrode body, the one of the points being farthest from the discharge surface, the welding surface is located in the first direction from an outer surface of the ground electrode body, and the welding surface includes a flat portion whose distance to the point P1 in the first direction is 0.05 mm or smaller, and when a point E1 and a point E2 are defined as ends of the flat portion and a second direction is defined as a direction from the point E2 toward the point E1, in the second direction from the point E1, a distance between the welding surface and the discharge surface in the first direction is smaller than a distance between the discharge surface and the point E1 in the first direction, and a linear length L1 of the discharge surface, a length L2 of the flat portion in the second direction, and a length L3 from the outer surface of the ground electrode body to the point P1 in the first direction satisfy $$1.4 \text{ mm} \leq L1 \leq 1.7 \text{ mm}, 0.4 \leq (L2/L1) \leq 0.8, \text{ and } 0.1 \text{ mm} \leq L3 \leq 0.4 \text{ mm}.$$

With the structure described above, in the specific sectional plane, the welding surface of the electrode tip includes the flat portion; and in the second direction from the end point E2 of the flat portion, the distance between the welding surface and the discharge surface in the first direction is smaller than the distance between the discharge surface and the point E1 in the first direction. The linear length L1 of the discharge surface, the length L2 of the flat portion in the second direction, and the length L3 from the outer surface of the ground electrode body to the point P1 are appropriately set so as to satisfy the above expressions. As a result, the occurrence of an irregularity in the pressure between the electrode tip and the electrode body during resistance welding can be suppressed, and an irregularity of the joint strength of a resistance weld can be suppressed. Accordingly, peeling of the electrode tip is suppressed, and the durability of the spark plug can be improved.

Application Example 2

In accordance with a second aspect of the present invention, there is provided a spark plug according to application example 1, in which, in the specific sectional plane, the welding surface includes a side portion that has an acute angle of 20 degrees or smaller with respect to the first direction, and in which a length L4 in the first direction from the outer surface of the ground electrode body to an end of the side portion in the first direction is 0.05 mm or larger.

In the case where the length L4 from the outer surface to the end of the side portion in the first direction is 0.05 mm or larger, decrease of welding strength, which may occur if the electrode body becomes damaged due to oxidation, can be suppressed. As a result, peeling of the electrode tip can be suppressed, and the durability of the spark plug can be further improved.

Application Example 3

In accordance with a third aspect of the present invention, there is provided a method of making a spark plug including a center electrode, a ground electrode body, and an electrode tip that is resistance welded to the ground electrode body and that has a discharge surface that forms a gap between the discharge surface and the center electrode, the method including:

a joining step of resistance welding the electrode tip to the ground electrode body, in which, in a specific sectional plane, which is one of sectional planes that perpendicularly cut the discharge surface of the electrode tip after the joining step and which cuts the discharge surface so that a linear length of the discharge surface is largest, when a first direction is defined as a direction that is perpendicular to the discharge surface and in which the ground electrode body is located as viewed from the discharge surface and a point P1 is defined as one of points on a welding surface of the electrode tip where the electrode tip is welded to the ground electrode body, the one of the points being farthest from the discharge surface, the welding surface is located in the first direction from an outer surface of the ground electrode body, and the welding surface includes a flat portion whose distance to the point P1 in the first direction is 0.05 mm or smaller, and when a point E1 and a point E2 are defined as ends of the flat portion and a second direction is defined as a direction from the point E2 toward the point E1, in the second direction from the point E1, a distance between the welding surface and the discharge surface in the first direction is smaller than a distance between the discharge surface and the point E1 in the first direction, and a linear length L1 of the discharge surface, a length L2 of the flat portion in the second direction, and a length L3 from the outer surface of the ground electrode body to the point P1 in the first direction satisfy $$1.4 \text{ mm} \leq L1 \leq 1.7 \text{ mm}, 0.4 \leq (L2/L1) \leq 0.8, \text{ and } 0.1 \text{ mm} \leq L3 \leq 0.4 \text{ mm}.$$

According to the method described above, in the specific sectional plane after welding, the welding surface of the electrode tip includes the flat portion; and in the second direction from the end point E2 of the flat portion, the distance between the welding surface and the discharge surface in the first direction is smaller than the distance between the discharge surface and the point E1 in the first direction. The linear length L1 of the discharge surface, the length L2 of the flat portion in the second direction, and the length L3 from the outer surface of the ground electrode body to the point P1 are appropriately set so as to satisfy the above expressions. As a result, the occurrence of an irregularity in the pressure between the electrode tip and the electrode body during resistance welding can be suppressed, and an irregularity of the strength of a resistance weld can be suppressed. Accordingly, it is possible to make a spark plug in which peeling of the electrode tip is suppressed and that has improved durability.

Application Example 4

In accordance with a fourth aspect of the present invention, there is provided a method of making a spark plug according to application example 3, further including:

a step of removing, after the joining step, a part of the electrode tip and a part of the ground electrode body by cutting the electrode tip and the ground electrode body along a sectional plane passing through both of the ground electrode body and the electrode tip joined to the ground electrode body.

The present invention can be realized in various aspects, such as a spark plug, an ignition device using a spark plug, an internal combustion engine including the spark plug, an internal combustion engine including an ignition device including the spark plug, and a method of making a spark plug.

DETAILED DESCRIPTION OF THE PREFERRED EMBODIMENTS

A. First Embodiment

A-1. Structure of Spark Plug

Figure 1:
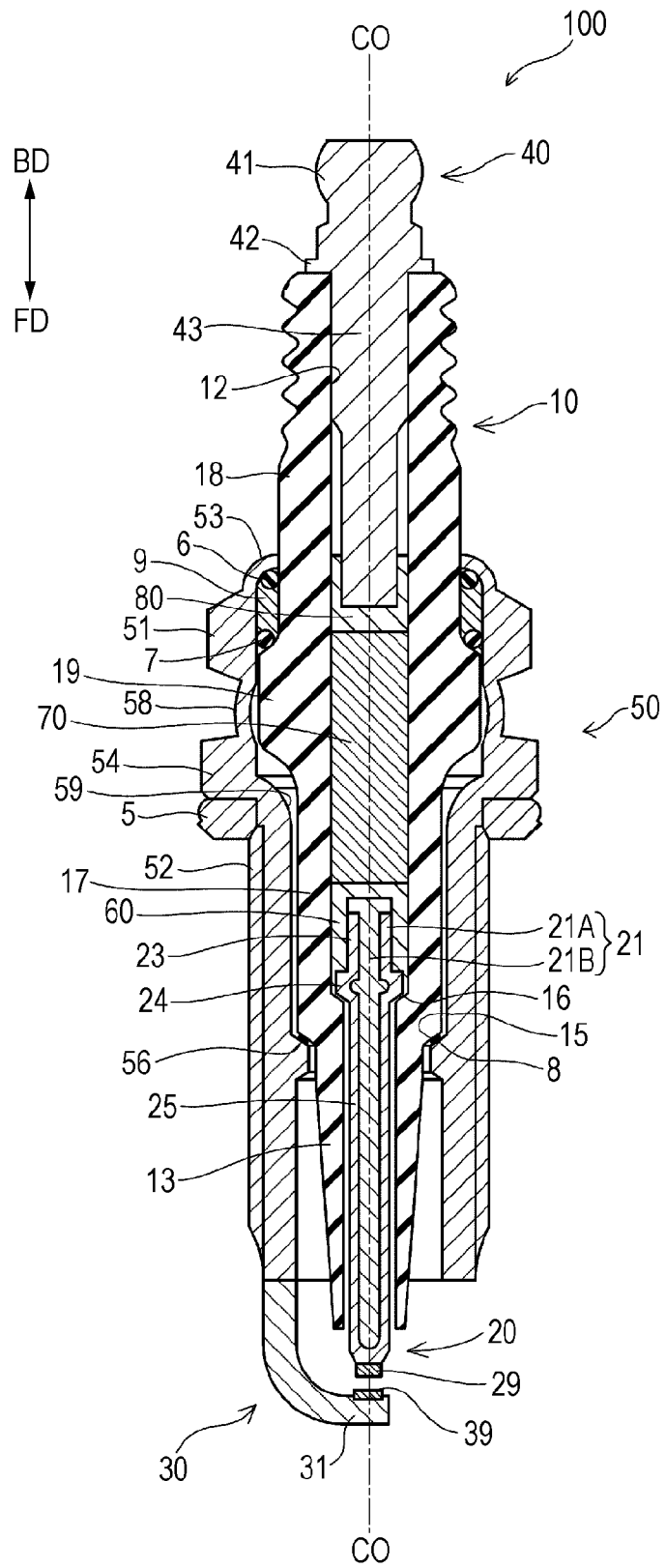
FIG. 1 is a sectional view of a spark plug 100.

Hereinafter, some of the aspects of the present invention will be described on the basis of embodiments. FIG. 1 is a sectional view of a spark plug 100 according to the present embodiment. A chain line in FIG. 1 represents the axis CO of the spark plug 100 (also referred to as the "axis CO"). The direction parallel to the axis CO (the vertical direction in FIG. 1) may be also referred to as the "axial direction." The radial direction of a circle centered on the axis CO may be simply referred to as the "radial direction," and the circumferential direction of a circle centered on the axis CO may be simply referred to as the "circumferential direction." The downward direction in FIG. 1 will be referred to as a distal direction FD, and the upward direction in FIG. 1 may be referred to as a proximal direction BD. The downward direction in FIG. 1 will be referred to as the "distal direction" of the spark plug 100, and the upward direction in FIG. 1 will be referred to as the "proximal direction" of the spark plug 100. The spark plug 100 includes an insulator 10 for insulation, a center electrode 20, a ground electrode 30, a terminal 40, and a metallic shell 50.

The insulator 10 is made by sintering alumina and the like. The insulator 10 is a substantially cylindrical member that extends in the axial direction and that has a through-hole 12 (axial hole) extending through the insulator 10. The insulator 10 includes a flange 19, a proximal body 18, a distal body 17, a stepped portion 15 and an elongated leg 13. The proximal body 18 is located in the proximal direction from the flange 19 and has an outside diameter smaller than that of the flange 19. The distal body 17 is located in the distal direction from the flange 19 and has an outside diameter smaller than that of the flange 19. The elongated leg 13 is located in the distal direction from the distal body 17 and has an outside diameter smaller than that of the distal body 17. When the spark plug 100 is attached to an internal combustion engine (not shown), the elongated leg 13 is exposed in a combustion chamber of the internal combustion engine. The stepped portion 15 is disposed between the elongated leg 13 and the distal body 17.

The metallic shell 50 is a cylindrical metallic member that is made of an electroconductive metal material (for example, low-carbon steel) and that is used to fix the spark plug 100 to an engine head (not shown) of an internal combustion engine. The metallic shell 50 has an insertion hole 59 extending therethrough along the axis CO. The metallic shell 50 is disposed around the periphery of the insulator 10. In other words, the insulator 10 is inserted and held in the insertion hole 59 of the metallic shell 50. The distal end of the insulator 10 protrudes to a position beyond the distal end of the metallic shell 50 in the distal direction. The proximal end of the insulator 10 protrudes to a position beyond the proximal end of the metallic shell 50 in the proximal direction.

The metallic shell 50 includes a tool engagement portion 51, which has a hexagonal columnar shape and with which a spark plug wrench engages; a threaded portion 52, which is to be attached to an internal combustion engine; and a seating portion 54, which has a flange-like shape and is disposed between the tool engagement portion 51 and the threaded portion 52. The nominal diameter of the threaded portion 52 is, for example, one of M8 (8 mm (millimeter)), M10, M12, M14 and M18.

A gasket 5, which is made by bending a metal plate and has an annular shape, is interposed between the threaded portion 52 and the seating portion 54 of the metallic shell 50. When the spark plug 100 is attached to an internal combustion engine, the gasket 5 seals a gap between the spark plug 100 and the internal combustion engine (engine head).

The metallic shell 50 further includes a thin-walled crimping portion 53, which is disposed in the proximal direction from the tool engagement portion 51; and a thin-walled compressive deformation portion 58, which is disposed between the seating portion 54 and the tool engagement portion 51. Ring members 6 and 7, which have annular shapes, are disposed in an annular region between an inner peripheral surface of a part of the metallic shell 50, the part extending from the tool engagement portion 51 to the crimping portion 53, and an outer peripheral surface of the proximal body 18 of the insulator 10. A space between the two ring members 6 and 7 in this region is filled with powder of talc (talc) 9. The proximal end of the crimping portion 53 is bent inward in the radial direction and fixed to the outer peripheral surface of the insulator 10. In a manufacturing process, the compressive deformation portion 58 of the metallic shell 50 becomes compressively deformed when the crimping portion 53, which is fixed to the outer peripheral surface of the insulator 10, is pressed in the distal direction. Due to compressive deformation of the compressive deformation portion 58, the insulator 10 is pressed in the distal direction in the metallic shell 50 via the ring members 6 and 7 and the talc 9. A stepped portion 56 (metallic-shell-side stepped portion), which is formed on an inner periphery of the threaded portion 52 of the metallic shell 50, presses the stepped portion 15 (insulator-side stepped portion) of the insulator 10 via a plate packing 8, which is made of a metal and has an annular shape. As a result, the plate packing 8 prevents a gas in a combustion chamber of an internal combustion engine from leaking to the outside through a gap between the metallic shell 50 and the insulator 10.

The center electrode 20 includes a center electrode body 21, which has a bar-like shape and extends in the axial direction; and a center electrode tip 29, which has a solid cylindrical shape and is joined to the distal end of the center electrode body 21. The center electrode body 21 is disposed in a distal part of the through-hole 12 of the insulator 10. The center electrode body 21 has a structure including an electrode base 21A and a core 21B, which is embedded in the electrode base 21A. The electrode base 21A is made of, for example, nickel or a nickel alloy. In the present embodiment, the electrode base 21A is made of INCONEL 600 ("INCONEL" is a registered trademark). The core 21B is made of copper or a copper alloy, which has a thermal conductivity higher than that of an alloy from which the electrode base 21A is made. In the present embodiment, the core 21B is made of copper.

The center electrode body 21 includes a flange 24 (also referred to as a "flange portion"), which is located at a predetermined position in the axial direction; a head 23 (electrode head), which is located in the proximal direction from the flange 24; and a leg 25 (electrode leg), which is located in the distal direction from the flange 24. The flange 24 is supported by a stepped portion 15 of the insulator 10. A distal end portion of the leg 25, that is, the distal end of the center electrode body 21, protrudes to a position beyond the distal end of the insulator 10 in the distal direction.

The ground electrode 30 includes a ground electrode body 31, which is joined to the distal end of the metallic shell 50; and a ground electrode tip 39, which has a solid cylindrical shape.

The terminal 40 is a bar-shaped member extending in the axial direction. The terminal 40 is made of an electroconductive metal material (for example, low-carbon steel), and an anti-corrosive metal layer (such as a Ni layer) is formed on the surface of the terminal 40 by plating or the like. The terminal 40 includes a flange 42 (terminal flange), which is located at a predetermined position in the axial direction; a cap attachment portion 41, which is located in the proximal direction from the flange 42; and a leg 43 (terminal leg), which is located in the distal direction from the flange 42. The cap attachment portion 41 of the terminal 40 is exposed in a space in the proximal direction from the insulator 10. The leg 43 of the terminal 40 is inserted into the through-hole 12 of the insulator 10. A plug cap, to which a high-voltage cable (not shown) is connected, is attached to the cap attachment portion 41, and a high voltage for causing a spark discharge is applied to the cap attachment portion 41.

In the through-hole 12 of the insulator 10, a resistor 70, for reducing electromagnetic noise during spark discharge, is disposed between the distal end of the terminal 40 (the distal end of the leg 43) and the proximal end of the center electrode 20 (the proximal end of the head 23). The resistor 70 is made of, for example, a composite material including glass particles as a main component, ceramic particles other than glass particles and an electroconductive material. In the through-hole 12, a space between the resistor 70 and the center electrode 20 is filled with an electroconductive seal 60. A space between the resistor 70 and the terminal 40 is filled with an electroconductive seal 80. The electroconductive seals 60 and 80 are made of, for example, a composite material including glass particles, such as $B_2O_3$—$SiO_2$-based glass particles, and metal particles (Cu, Fe, or the like).

A-2. Structure of Distal End Portion of Spark Plug 100

Figure 2A:
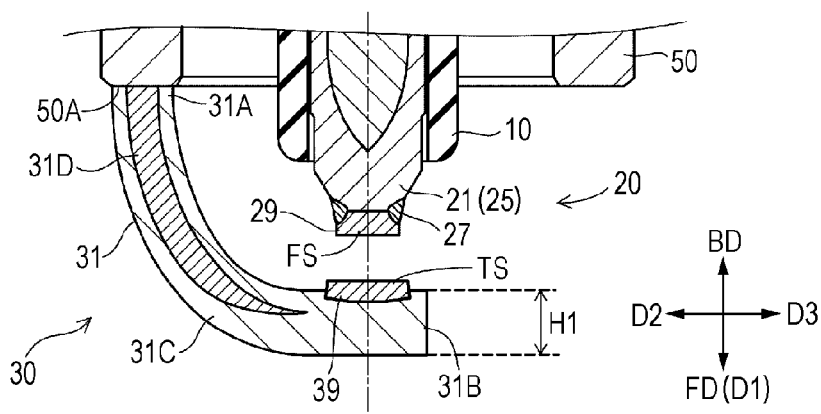
FIGS. 2(A), 2(B) and 2(c) illustrate a part of the spark plug 100 near the distal end thereof.
Figure 2B:
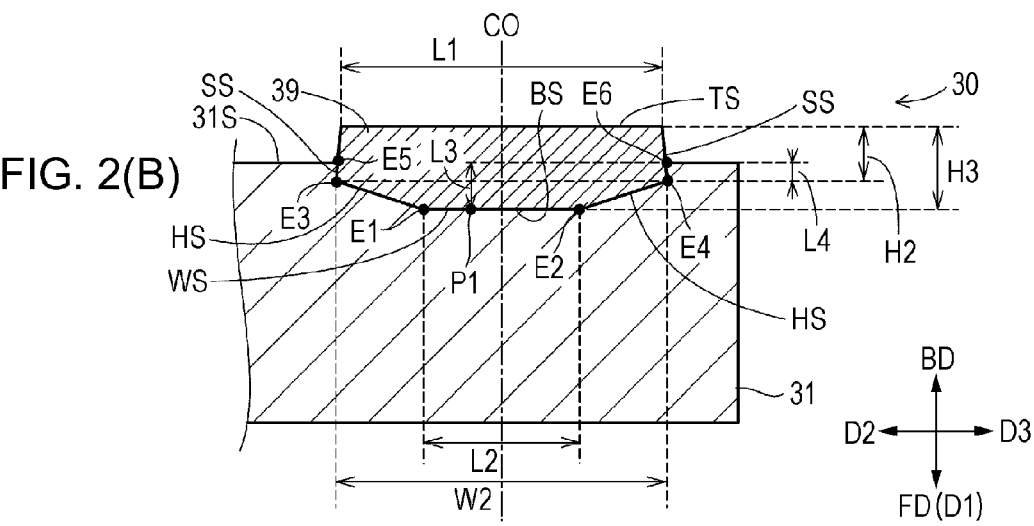
Figure 2C:
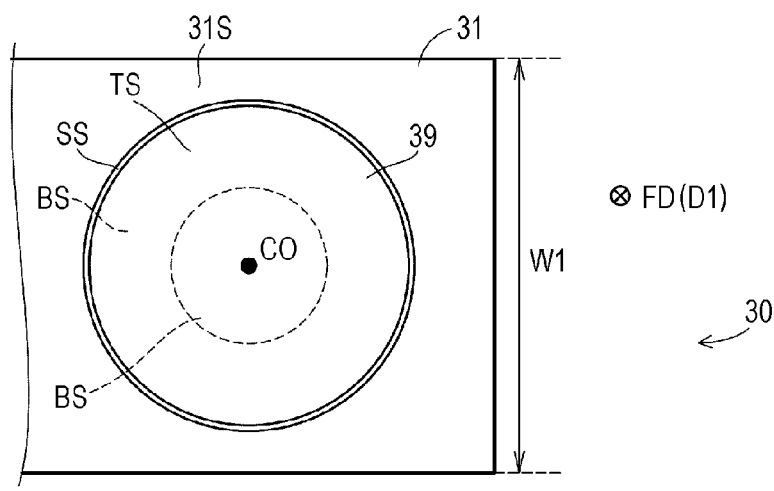

The structure of a part of the spark plug 100 near the distal end thereof will be described in further detail. FIGS. 2(A)-2(C) illustrate a part of the spark plug 100 near the distal end thereof. FIG. 2(A) illustrates a sectional view of a part of the spark plug 100 near the distal end, which is cut along a specific sectional plane including the axis CO. FIG. 2(B) illustrates an enlarged view a part of the spark plug 100 near the ground electrode tip 39 in the specific sectional plane of FIG. 2(A). FIG. 2(C) illustrates the part of the spark plug 100 near the ground electrode tip 39, as viewed in the distal direction FD along the axis CO from a position in the proximal direction BD from the ground electrode tip 39.

The center electrode tip 29 is joined to the distal end of the center electrode body 21 (the distal end of the leg 25) by, for example, laser welding. A numeral 27 in FIG. 2(A) denotes a fusion zone that is formed by laser welding when joining the center electrode tip 29 to the center electrode body 21. The center electrode tip 29 is made of a material including a noble metal, having a high melting point, as the main component. For example, iridium (Ir) or an Ir alloy is used as the material of the center electrode tip 29.

The ground electrode body 31 is a curved bar-shaped member having a quadrangular cross section. A proximal end 31A of the ground electrode body 31 is joined to a distal end surface 50A of the metallic shell 50. Thus, the ground electrode body 31 is electrically connected to the metallic shell 50. A distal end 31B of the ground electrode body 31 is a free end.

The ground electrode body 31 has a structure including an electrode base 31C and a core 31D, which is embedded in the electrode base 31C. The electrode base 31C is made of an anti-corrosive metal, such as a nickel alloy. In the present embodiment, the electrode base 31C is made of INCONEL 601. The core 31D is made of a metal having a coefficient of thermal conductivity higher than (thermal conductivity better than) that of the electrode base 31C, such as copper, or a copper alloy. In the present embodiment, the core 31D is made of copper. It can be said that the electrode base 31C is a member that forms a surface of the ground electrode body 31.

A cross section of the ground electrode body 31, taken along a plane perpendicular to the axis of the bar-like shape, is shaped like a rectangle. Let H1 denote the length of a side of this rectangle parallel to the specific sectional plane of FIG. 2(B). Let W1 denote the length of a side of this rectangle perpendicular to the specific sectional plane of FIG. 2(B), that is, the length of a side extending in the vertical direction of FIG. 2(C).

The ground electrode tip 39 is a substantially cylindrical solid member made of, for example, Pt (platinum), a Pt alloy, or the like. In the present embodiment, the ground electrode tip 39 is made of a Pt-20Rh alloy (a platinum alloy including 20 mass % of rhodium).

The ground electrode tip 39 has a discharge surface TS, which forms a gap where a spark discharge occurs (also referred to as a "gap") between the discharge surface TS and a distal end surface FS of the center electrode tip 29 of the center electrode 20. In the spark plug 100 according to the present embodiment, the discharge surface TS is perpendicular to the axis CO (FIG. 2(B)). Accordingly, it can be said that the specific sectional plane of FIGS. 2(A) and 2(B) is one of sectional planes that perpendicularly cut the discharge surface TS. The shape of the discharge surface TS of the ground electrode tip 39 FD is circular (FIG. 2(C)), as viewed in the distal direction FD along the axis CO from a position in the proximal direction BD from the discharge surface TS. Accordingly, in all sectional planes that include the axis CO and that perpendicularly cut the discharge surface TS, the linear length of the discharge surface TS is the same. Accordingly, it can be also said that the specific sectional plane of FIGS. 2(A) and 2(B) is one of sectional planes that perpendicularly cut the discharge surface TS, the specific sectional plane cutting the discharge surface TS so that the linear length of the discharge surface TS is largest.

A first direction D1 is defined as a direction that is perpendicular to the discharge surface TS of the ground electrode tip 39 and in which the ground electrode body 31 is located as viewed from the discharge surface TS. The first direction D1 is the same as the distal direction FD.

A surface of the ground electrode tip 39 facing in the first direction D1 is a welding surface WS where the ground electrode tip 39 is joined to the ground electrode body 31 by resistance welding. The welding surface WS is located in the first direction D1 from an outer surface 31S the ground electrode body 31, to which the ground electrode tip 39 is welded. In other words, the ground electrode tip 39 is resistance welded to the ground electrode body 31 so that a part of the ground electrode tip 39 facing in the first direction D1 is embedded in the ground electrode body 31.

In the specific sectional plane of FIG. 2(B), a line extending from a point E5 to a point E6 through points E3, E1, E2, and E4 represents the welding surface WS. The welding surface WS includes a side portion SS, a non-flat portion HS, and a flat portion BS. The definitions of the portions SS, HS, and BS of the welding surface WS will be described.

Figure 3:
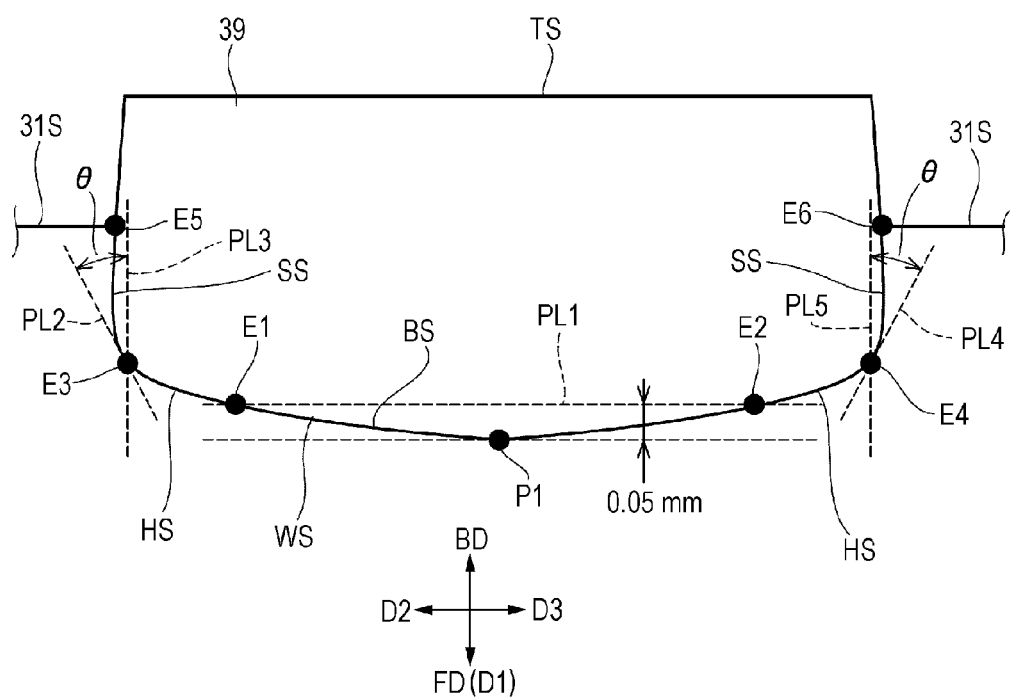
FIG. 3 is a diagram explaining the definitions of portions of a welding surface WS.

FIG. 3 is a diagram explaining the definitions of the portions SS, HS, and BS of the welding surface WS. In FIG. 3, in order to explain the definitions easily, the shape of the specific sectional plane of FIG. 2(B) is changed and hatching is omitted.

The flat portion BS can be defined as follows. A point P1 is defined as one of points on the welding surface WS that is farthest from the discharge surface TS, in other words, that is at a largest distance from the discharge surface TS in the first direction D1 (FIG. 3). Then, the flat portion BS is defined as a part of the welding surface WS whose distance to the point P1 in the first direction is 0.05 mm or smaller. As illustrated in FIG. 3, in the specific sectional plane, when points E1 and E2 are defined as two intersections of the welding surface WS and a line PL1, which is parallel to the discharge surface TS and whose distance to the point P1 in the first direction is 0.05 mm, a region between the point E1 and the point E2 is the flat portion BS.

The side portion SS can be defined as follows. The side portion SS is a part of the welding surface WS that has an acute angle θ of 20 degrees or smaller with respect to the first direction D1. As illustrated in FIG. 3, in the specific sectional plane, points E3 and E4 are defined as two points on the welding surface WS at which an acute angle θ with respect to the first direction D1 is 20 degrees. In other words, in FIG. 3, the acute angle θ between a tangent line PL2 of the welding surface WS, which passes through the point E3, and a line PL3, which is parallel to the first direction D1, is 20 degrees; and an acute angle θ between a tangent line PL4 of the welding surface WS, which passes through the point E4, and a line PL5, which is parallel to the first direction D1, is 20 degrees. A region between the point E5 and the point E3 and a region between the point E6 and the point E4 are the side portion SS.

The non-flat portion HS is a region between the flat portion BS and the side portion SS. A region between the point E3 and the point E1 and a region between the point E2 and the point E4 are the non-flat portion HS.

Referring back to FIG. 2, description will be continued. As illustrated in FIG. 3(C), in the first embodiment, the flat portion BS is a substantially circular region, because the ground electrode tip 39 has a substantially cylindrical solid shape.

In the specific sectional plane of FIG. 2(B), a second direction D2 is defined as a direction from the point E2 toward the point E1, that is, the leftward direction in FIG. 2(B). A third direction D3 is defined as a direction opposite to the second direction D2, that is, the rightward direction in FIG. 2(B). In the second direction D2 from the point E1, that is, in the non-flat portion HS in a left part of FIG. 2(B), the distance between the welding surface WS and the discharge surface TS in the first direction D1 is smaller than a distance H3 between the discharge surface TS and the point E1 in the first direction D1.

To be more specific, in the specific sectional plane of FIG. 2(B), in the non-flat portion HS in the second direction D2 from (on the left side of) the point E1, the distance between the welding surface WS and the discharge surface TS in the first direction D1 continuously decreases from H3 to H2 in the second direction D2.

Likewise, in the third direction D3 from the point E2, that is, in the non-flat portion HS in a right part of FIG. 2(B), the distance between the welding surface WS and the discharge surface TS in the first direction D1 is smaller than the distance H3 between the discharge surface TS and the point E2 in the first direction D1.

To be more specific, in the specific sectional plane of FIG. 2(B), in the non-flat portion HS in the third direction D3 from (on the right side of) the point E2, the distance between the welding surface WS and the discharge surface TS in the first direction D1 continuously decreases from H3 to H2 in the third direction D3.

In the specific sectional plane of FIG. 2(B), let L1 denote the linear length of the discharge surface TS. Let L2 denote the length of the flat portion BS in the second direction D2. Let L3 denote the length from the outer surface 31S of the ground electrode body 31 to the point P1 in the first direction D1. Let L4 denote the length in the first direction D1 from the outer surface 31S of the ground electrode body 31 to the ends E3 and E4 of the side portion SS in the first direction D1. Let W2 denote the length between the point E3 and the point E4 in the second direction D2.

B: Making Method

A method of making the spark plug 100 will be described with an emphasis on a method of making the ground electrode 30. FIG. 4 illustrates the method of making the ground electrode 30. First, the ground electrode body 31, which has not been bent and is bar-shaped, is prepared. The ground electrode tip 39, which has not been welded to the outer surface 31S of the ground electrode body 31, is prepared.

Figure 4A:
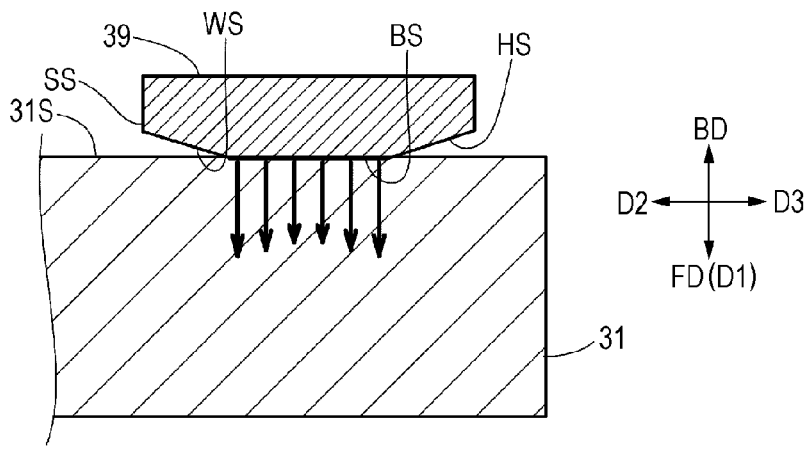
FIGS. 4(A), 4(B) and 4(C) illustrate the structure of an end portion of the spark plug.

Next, a joining step of resistance welding the ground electrode tip 39 to the ground electrode body 31 is performed. As illustrated in FIG. 4(A), in the joining step, the welding surface WS of the ground electrode tip 39 is brought into contact with (is pressed against) the outer surface 31S of the ground electrode body 31 with a predetermined force in the first direction D1. In the state in which the ground electrode tip 39 is pressed against the ground electrode body 31, a predetermined voltage is applied between the ground electrode tip 39 and the ground electrode body 31, thereby resistance welding the ground electrode tip 39 to the ground electrode body 31.

The shape of the ground electrode tip 39 before welding (FIG. -4A) and the shape of the ground electrode tip 39 after welding (FIG. 2) are substantially the same. However, due to resistance welding, deformation of the ground electrode tip 39 occurs. To be specific, deformation of a part of the ground electrode tip 39 facing in the first direction D1, whose temperature becomes comparatively high due to resistance welding, occurs; but deformation of a part of the ground electrode tip 39 facing in a direction opposite to the first direction D1 does not occur. For example, before welding, the side surface of the ground electrode tip 39, including the side portion SS, is parallel to the first direction D1 (FIG. 3). In contrast, in the ground electrode tip 39 after welding, the angle between the side surface, including the side portion SS, becomes larger than 0 degrees with respect to the first direction D1, and the length W2 between the point E3 and the point E4 in the second direction D2 becomes slightly larger than the linear length L1 of the discharge surface TS.

In the spark plug 100 according to the present embodiment, a diffusion layer (for example, a layer having a thickness of approximately 2 μm), in which the components of the ground electrode tip 39 and the components of the ground electrode body 31 are diffused, is formed along the welding surface WS. However, a fusion zone, in which the components of the ground electrode tip 39 and the components of the ground electrode body 31 are fused together, is not formed. This is because temperature does not become high enough to form a fusion zone. For example, FIG. 4(C) illustrates a making method according to a comparative example. As illustrated in FIG. 4(C), if a projection PJ, which has a diameter of about 0.3 mm, is formed on a welding surface WSb of a ground electrode tip 39b and resistance welding is performed, an electric current intensively flows through the projection PJ and the temperature of the projection PJ becomes extremely high. As a result, after welding, a comparatively large fusion zone (for example, having a thickness of 0.3 mm) is formed (not shown) at a central part of the welding surface WSb of the ground electrode tip 39b. In the spark plug 100 according to the present embodiment, such a fusion zone is not formed. If a fusion zone were formed, the thickness of the ground electrode tip 39 would be reduced due to the fusion zone, and the durability of the spark plug 100 might decrease.

C: First Evaluation Test

In a first evaluation test, as shown in Table 1, the anti-peeling performance of the ground electrode tip 39 was assessed by using five sample groups G1 to G5, between which the value of the ratio (L2/L1), which is the ratio of the length L2 of the flat portion BS in the second direction D2 to the linear length L1 of the discharge surface TS in the specific sectional plane, differed.

TABLE 1

| L3 | L1 (mm) | | | | |
|---|---|---|---|---|---|
| (mm) | 0.7 | 1 | 1.4 | 1.7 | 2 |
| Sample Group G1 (L2/L1) = 1 | | | | | |
| 0.05 | B | B | B | B | B |
| 0.1 | A | A | B | B | B |
| 0.4 | A | A | B | B | B |
| Sample Group G2 (L2/L1) = 0.8 | | | | | |
| 0.05 | B | B | B | B | B |
| 0.1 | B | A | A | A | B |
| 0.4 | B | A | A | A | B |
| Sample Group G3 (L2/L1) = 0.6 | | | | | |
| 0.05 | B | B | B | B | B |
| 0.1 | B | B | A | A | B |
| 0.4 | B | B | A | A | B |
| Sample Group G4 (L2/L1) = 0.4 | | | | | |
| 0.05 | B | B | B | B | B |
| 0.1 | B | B | A | A | B |
| 0.4 | B | B | A | A | B |
| Sample Group G5 (L2/L1) = 0.2 | | | | | |
| 0.05 | B | B | B | B | B |
| 0.1 | B | B | B | B | B |
| 0.4 | B | B | B | B | B |

As shown in Table 1, the values (L2/L1) of the sample groups G1 to G5 are respectively 1, 0.8, 0.6, 0.4, and 0.2. A smaller value of (L2/L1) means that the flat portion BS is smaller relative to the discharge surface TS. In the sample group G1, (L2/L1)=1, which means that the ground electrode tip 39 that does not have the non-flat portion HS is used.

Each of the sample groups includes fifteen samples. The fifteen samples differ from each other in the value of at least one of the linear length L1 of the discharge surface TS in the specific sectional plane and the length L3 in the first direction D1 from the outer surface 31S of the ground electrode body 31 to the point P1 in the specific sectional plane. The linear length L1 of the discharge surface TS has one of the values 0.7 mm, 1 mm, 1.4 mm, 1.7 mm, and 2 mm. The length L3 from the outer surface 31S to the point P1 in the first direction D1 has one of the values 0.05 mm, 0.1 mm, and 0.4 mm.

Dimensions common to the samples are as follows.

length (H3-H2) in the first direction D1 from the ends E1 and E2 of the flat portion BS to the ends E3 and E4 of the non-flat portion HS in the specific sectional plane: 0.05 mm length H3 in the first direction D1 from the discharge surface TS to the ends E1 and E2 of the flat portion BS: 0.6 mm In the first evaluation test, a cycle of heating and cooling a region near the distal end (a region near the ground electrode tip 39) of each sample was repeated 1000 times. To be specific, in one cycle, the region near the distal end of each sample was heated for 2 minutes by using a burner and then cooled in air for 1 minute (also referred to as "thermal shock testing"). The flame size of the burner was adjusted so that the temperature of the ground electrode tip 39 could reach 1050 degrees Celsius, which was a target temperature, by performing heating for 2 minutes.

Subsequently, the ground electrode 30 of each sample was cut and the aforementioned specific sectional plane (FIG. 2(B)) was observed. In the specific sectional plane, a part of a region of the welding surface WS from the point E3 to E4 (region having the length W2 in the second direction D2) in which a joint was maintained and a part of the region in which peeling occurred were identified. By observing the specific sectional plane with a magnifying glass, it is possible to identify a part in which the joint is maintained and a part in which peeling has occurred, because oxide scale is not generated in the part in which the joint is maintained but oxide scale is generated in the part in which peeling has occurred. The proportion (hereinafter, "joint proportion") of the length in the second direction D2 of the part in which a joint is maintained to the length W2 in the second direction D2 of a region from the point E3 to the point E4 was calculated. The evaluation of a sample whose joint proportion was 50% or higher was rated as "A" and the evaluation of a sample whose joint proportion was lower than 50% was rated as "B."

The evaluations of samples in which the length L3 from the outer surface 31S to the point P1 in the first direction D1 was 0.05 mm were "B," irrespective of the linear length L1 and the ratio (L2/L1). The evaluations of samples in which the length L3 was 0.1 mm or 0.4 mm were "A" or "B," depending on the other conditions (the linear length L1 and the ratio (L2/L1)). There was no difference between the evaluations of samples in which the length L3 was 0.1 mm and the evaluations of samples in which the length L3 was 0.4 mm, provided that the other conditions (the linear length L1, the linear length L1, and the ratio (L2/L1)) were the same.

The length L3 of the samples represents a length over which the ground electrode tip 39 is embedded in the ground electrode body 31. This evaluation result shows that, in order to suppress peeling of the ground electrode tip 39, it is necessary that the ground electrode tip 39 be embedded in the ground electrode tip 39 over a certain length. To be specific, the first evaluation test shows that it is preferable that 0.1 mm≤L3. The first evaluation test shows that, at least in the case where 0.1 mm≤L3≤0.4 mm is satisfied, there is a possibility that peeling of the ground electrode tip 39 can be suppressed by appropriately setting the linear length L1 and the ratio (L2/L1).

Next, the evaluation results of samples that satisfy 0.1 mm≤L3≤0.4 mm will be examined. Unless otherwise noted, the following description is about the samples that satisfy 0.1 mm≤L3≤0.4 mm.

First, in the sample group G1, in which the ratio (L2/L1)=1, that is, in a sample group in which the ground electrode tip 39 that does not have the non-flat portion HS of FIG. 2 was used, the evaluations of samples in which the linear length L1 of the discharge surface TS was 0.7 mm or 1 mm were "A", but the evaluations of samples in which the linear length L1 of the discharge surface TS was 1.4 mm, 1.7 mm, or 2 mm were "B".

This evaluation result shows that, in the case where the ground electrode tip 39 does not have the non-flat portion HS, the ground electrode tip 39 having a linear length L1 of 0.7 mm or 1 mm, that is, the ground electrode tip 39 having a comparatively small linear length L1 has a good anti-peeling performance. On the other hand, the ground electrode tip 39 having a linear length L1 of 1.4 mm, 1.7 mm, or 2 mm, that is, the ground electrode tip 39 having a comparatively large linear length L1 does not have a good anti-peeling performance.

Figure 4B:
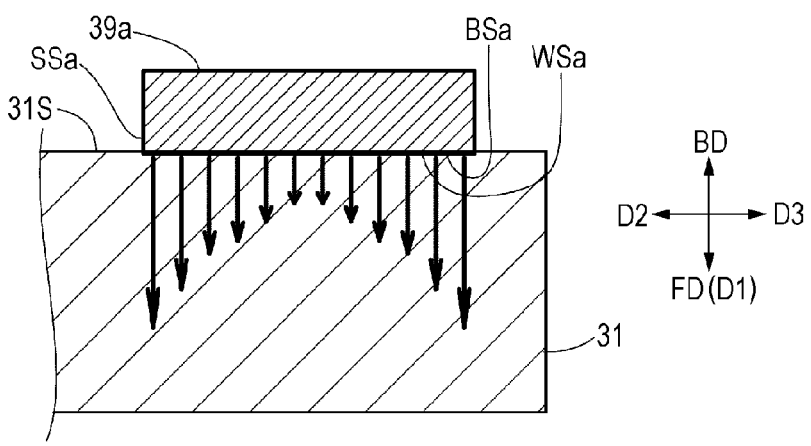
Figure 4C:
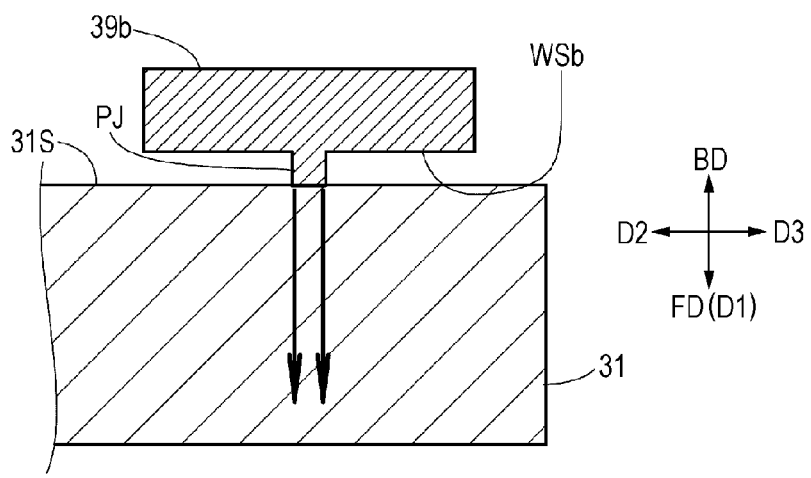

Referring to FIG. 4(B), the reason for this will be described. A welding surface WSa of a ground electrode tip 39a shown in FIG. 5(B) does not have the non-flat portion HS. Therefore, a flat portion BSa, which comes into contact with the outer surface 31S of the ground electrode body 31 in an initial stage of resistance welding, is larger than that of a case where the welding surface WSa has the non-flat portion HS. Then, in particular, when the linear length L1 is comparatively large, the length L2 (FIG. 2) of the flat portion BSa in the second direction D2 is also large, so that an irregularity in the contact pressure occurs at the contact surface between the flat portion BSa and the outer surface 31S. To be specific, in the specific sectional plane, the contact pressure is high at parts of the flat portion BSa near both ends thereof in the second direction D2, and the contact pressure is low in a central part of the flat portion BSa in the second direction D2. As the length L2 of the flat portion BSa in the second direction D2 increases, the difference between the contact pressures at the parts near both ends and the contact pressure at the central part increases.

In resistance welding, an electric current is more likely to flow through a region in which the contact pressure is higher, because the contact resistance in such a region is lower. Therefore, the temperature of such a region becomes higher and the joint strength in such a region becomes higher. In contrast, an electric current is less likely to flow through a region in which the contact pressure is lower, because the contact resistance in such a region is higher. Therefore, the temperature of such a region becomes lower and the joint strength in such a region becomes lower. Accordingly, as the length L2 of the flat portion BSa in the second direction D2 becomes larger, the joint strength at the central part becomes smaller relative to those of the parts near both ends. If the applied voltage and the pressure during resistance welding are increased in order increase the joint strength at the central part, the temperatures of the parts near both ends increase excessively, so that a spatter is generated. Generation of a spatter is not allowed, because a spatter may adhere to the ground electrode 30 and may cause trouble, such as the occurrence of a spark discharge from the spatter through an unintended path.

As can be understood from the above description, it is considered that, in the case where the ground electrode tip 39 does not have the non-flat portion HS and the linear length L1 of the discharge surface TS is comparatively large, if resistance welding is performed in such a way that a spatter is not generated, the joint strength at the central part does not become sufficient and the anti-peeling performance of the ground electrode tip 39 decreases. Moreover, in the case where the linear length L1 of the discharge surface TS is comparatively large, the linear length of the welding surface WS is also large, so that a stress generated due to the difference in the linear expansion coefficient between the ground electrode tip 39 and the ground electrode body 31 is large and the anti-peeling performance of the ground electrode tip 39 tends to decrease.

The evaluation of samples in the sample group G5, in which the ratio (L2/L1)=0.2, were all "B," irrespective of the other conditions (the linear length L1, the linear length L3, and the ratio (L2/L1)).

The reason for this is estimated as follows. In the case where the ratio (L2/L1) is excessively low, that is, in the case where the flat portion BS is excessively small relative to the discharge surface TS, during resistance welding, the contact pressure between the flat portion BS, which is located at a central part the second direction D2, and the outer surface 31S can be made sufficiently high. However, it is considered that the non-flat portion HS becomes too large and the contact pressures at, in particular, both end portions of the welding surface WS in the second direction D2 become too low. In other words, if the ratio (L2/L1)=0.2, the flat portion BS is excessively small relative to the discharge surface TS, so that the welding strength of the non-flat portion HS is insufficient although the flat portion BS can have a sufficiently high welding strength. As a result, it is considered that the anti-peeling performance of the ground electrode tip 39 decreases.

The evaluations of samples in the sample groups G2 to G4, in which the ratio (L2/L1) was 0.4, 0.6, or 0.8, were "A" or "B," depending on the other conditions (the linear length L1 and the length L3).

As can be understood from the above description, the first evaluation test shows that, in a case where $0.4 \leq (L2/L1) \leq 0.8$ is satisfied in addition to $0.1 \text{ mm} \leq L3 \leq 0.4 \text{ mm}$, there is a possibility that peeling of the ground electrode tip 39 can be suppressed by appropriately setting the linear length L1.

Next, the evaluation results of samples that satisfy $0.1 \text{ mm} \leq L3 \leq 0.4 \text{ mm}$ and $0.4 \leq (L2/L1) \leq 0.8$ will be examined. Unless otherwise noted, the following description is about the samples that satisfy $0.1 \text{ mm} \leq L3 \leq 0.4 \text{ mm}$.

First, the evaluations of any of the samples that satisfy $0.4 \leq (L2/L1) \leq 0.8$ and in which the linear length L1 of the discharge surface TS was 2 mm were "B." It is considered that the reason for this is that, if the linear length L1 of the discharge surface TS is 2 mm or larger, even if the flat portion BS and the non-flat portion HS are appropriately provided, the contact pressure of one of the flat portion BS and the non-flat portion HS becomes small, so that the welding strength becomes insufficient.

In the sample group G2, in which (L2/L1)=0.8, the evaluations of samples in which the linear length L1 of the discharge surface TS was 1 mm, 1.4 mm, or 1.7 mm were "A", and the evaluations of samples in which the linear length L1 of the discharge surface TS was 0.7 mm or 2 mm were "B".

In the sample group G3, in which (L2/L1)=0.6, the evaluations of samples in which the linear length L1 of the discharge surface TS was 1.4 mm or 1.7 mm were "A", and the evaluations of samples in which the linear length L1 of the discharge surface TS was 0.7 mm, 1 mm, or 2 mm were "B".

Likewise, in the sample group G4, in which (L2/L1)=0.4, the evaluations of samples in which the linear length L1 of the discharge surface TS was 1.4 mm or 1.7 mm were "A", and the evaluations of samples in which the linear length L1 of the discharge surface TS was 0.7 mm, 1 mm, or 2 mm were "B".

The above description shows that it is preferable that $0.1 \text{ mm} \leq L3 \leq 0.4 \text{ mm}$, $0.4 \leq (L2/L1) \leq 0.8$, and $1.4 \text{ mm} \leq L1 \leq 1.7 \text{ mm}$ be satisfied. In this case, the joint strength of the ground electrode tip 39 can be made uniform and peeling of the ground electrode tip 39 can be suppressed. As a result, the durability of the spark plug 100 can be improved.

To be more specific, in the case where all of the above conditions are satisfied, first, as illustrated in FIG. 4(A), the outer surface 31S of the ground electrode body 31 comes into contact with the flat portion BS, which has an appropriate size, in an initial stage of resistance welding. As resistance welding progresses, the non-flat portion HS, which has an appropriate size, comes into contact with the outer surface 31S. As a result, in resistance welding, irregularity in the contact pressure between the welding surface WS of the ground electrode tip 39 and the outer surface 31S of the ground electrode body 31 is suppressed, so that irregularity in the joint strength of the welding surface WS of the ground electrode tip 39 is suppressed. Accordingly, peeling of the ground electrode tip 39 is suppressed, and the durability of the spark plug 100 can be improved. Moreover, because irregularity in the joint strength is suppressed, it is not necessary to make a pressure and a voltage, which are to be applied during resistance welding, excessively high, so that generation of a spatter during resistance welding can be suppressed and productivity can be improved.

By making the spark plug 100 by using a method including a joining step of resistance welding the ground electrode tip 39 to the ground electrode body 31 in such a way that $0.1 \text{ mm} \leq L3 \leq 0.4 \text{ mm}$, $0.4 \leq (L2/L1) \leq 0.8$, and $1.4 \text{ mm} \leq L1 \leq 1.7 \text{ mm}$ are satisfied, it is possible to make a spark plug in which peeling of an electrode tip is suppressed and that has improved durability.

D: Second Evaluation Test

In a second evaluation test, as shown in Table 2, the anti-peeling performance of the ground electrode tip 39 was assessed by using four samples, between which at least one of the value of the length L4 (FIG. 2), which is the length in the first direction D1 from the outer surface 31S of the ground electrode body 31 to the ends E3 and E4 of the side portion SS in the first direction D1, and the value of the ratio (L2/L1) differed.

TABLE 2

|         |     | L4 (mm) |      |      |     |
|---------|-----|---------|------|------|-----|
|         |     | 0.03    | 0.05 | 0.07 | 0.1 |
| (L2/L1) | 0.4 | B       | A    | A    | A   |
|         | 0.8 | B       | A    | A    | A   |

The value of the length L4 was one of 0.03 mm, 0.05 mm, 0.07 mm, and 0.1 mm. The value of the ratio (L2/L1) was one of 0.4 and 0.8.

Dimensions common to the samples are as follows.

linear length L1 of the discharge surface TS in the specific sectional plane: 1.7 mm length L3 in the first direction D1 from the outer surface 31S of the ground electrode body 31 to the point P1 in the specific sectional plane: 0.2 mm length H3 in the first direction D1 from the discharge surface TS to the ends E1 and E2 of the flat portion BS: 0.6 mm In the second evaluation test, a cycle of heating and cooling a region near the distal end (a region near the ground electrode tip 39) of each sample was repeated 1000 times. To be specific, in one cycle, a region near the distal end of each sample was heated for 2 minutes by using a burner and then cooled in air for 1 minute (also referred to as "thermal shock testing"). The flame size of the burner was adjusted so that the temperature of the ground electrode tip 39 could reach 1100 degrees Celsius, which was a target temperature, by performing heating for 2 minutes. Subsequently, evaluation of each sample was performed in the same way as in the first evaluation test.

The evaluations of samples in which the length L4 was 0.03 mm were "B." The evaluations of samples in which the length L4 was 0.05 mm, 0.07 mm, or 0.1 mm were "A". The reason for this is estimated as follows. Due to the occurrence a spark discharge or exposure to high temperature in a combustion chamber, the outer surface 31S of the ground electrode body 31 may become oxidized and damaged. Due to such damage, peeling of the ground electrode tip 39 from the ground electrode body 31 may occur in a region of the welding surface WS from the point E3 to the point E4. However, as the length L4 in the first direction D1 from the outer surface 31S of the ground electrode body 31 to the ends E3 and E4 of the side portion SS in the first direction D1 becomes larger, the occurrence of peeling due to damage of the outer surface 31S of the ground electrode body 31 can be further suppressed. Therefore, in the case where the length L4 is 0.05 mm or larger, peeling of the ground electrode tip 39 is less likely to occur than in the case where the case where the length L4 is smaller than 0.05 mm.

As described above, the second evaluation test shows that it is more preferable that the length L4, which is the length in the first direction D1 from the outer surface 31S of the ground electrode body 31 to the ends E3 and E4 of the side portion SS in the first direction D1, be 0.05 mm or larger. In this case, it is possible to suppress decrease of welding strength in a case where the outer surface 31S of the ground electrode body 31 becomes damaged due to oxidation. As a result, peeling of the ground electrode tip 39 can be suppressed, and the durability of the spark plug 100 can be further improved.

E. Second Embodiment

Figure 5A:
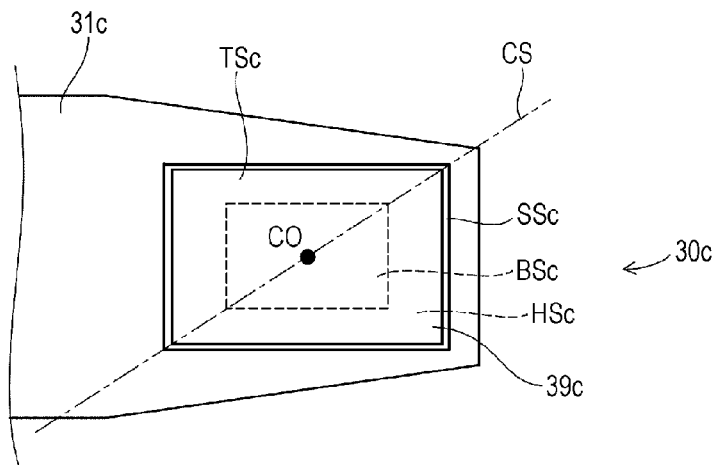
FIGS. 5(A) and 5(B) illustrate a ground electrode 30c.

FIG. 5 illustrates a ground electrode 30c of a spark plug according to a second embodiment. FIG. 5(A) illustrates the ground electrode 30c, as viewed in the first direction D1 along the axis CO from a position in a direction opposite to the first direction D1 from the ground electrode 30c. As can be understood from FIG. 5(A), the shape of a ground electrode tip 39c of the ground electrode 30c is rectangular, as viewed in the first direction D1 along the axis CO from a position in the direction opposite to the first direction D1 from the ground electrode tip 39c. Accordingly, the linear lengths of a discharge surface TSc in sectional planes that include the axis CO and that perpendicularly cut the discharge surface TSC differ from each other depending on the positions at which the sectional planes cut the discharge surface TSc. As illustrated in FIG. 5(A), a specific sectional plane, which is one of the sectional planes and which cuts the discharge surface TSc so that the linear length of the discharge surface TSc is largest, is a sectional plane CS, which passes through a diagonal line of the rectangular discharge surface TSc.

Figure 5B:
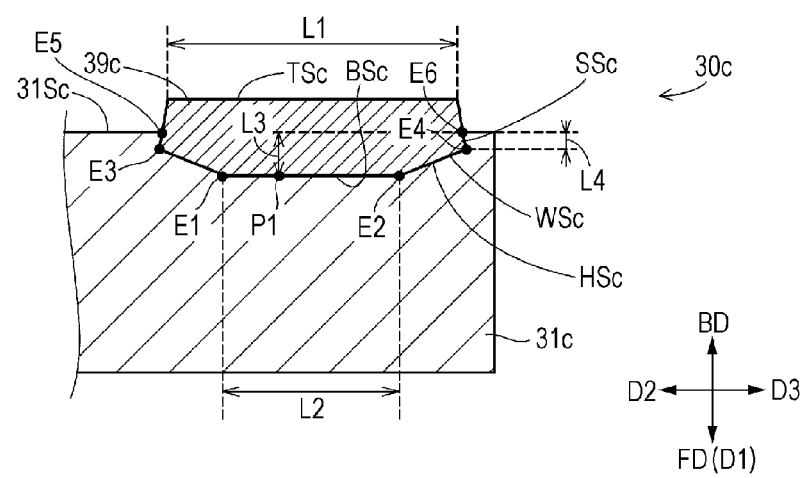

FIG. 5(B) illustrates the specific sectional plane, which is one of the sectional planes that perpendicularly cut the discharge surface TSc and which cuts the discharge surface TSc so that the linear length of the discharge surface TSc is largest.

The shape of the specific sectional plane according to the second embodiment is similar to that of the specific sectional plane according to the first embodiment (FIG. 2(B)). In other words, in the specific sectional plane CS shown in FIG. 5(B), a welding surface WSc, where the ground electrode tip 39c is welded to a ground electrode body 31c, includes, as in FIG. 2(B), a side portion SSc between a point E5 and a point E3, a side portion SSc between a point E6 and a point E4, a non-flat portion HSc between a point E1 and the point E3, a non-flat portion HSc between a point E2 and the point E4, and a flat portion BSc between the point E1 and the point E2. As with FIG. 2(B), in the specific sectional plane CS of FIG. 5(B), let L1 denote the linear length of the discharge surface TSc. Let L2 denote the length of the flat portion BSc in the second direction D2. Let L3 denote the length from an outer surface 31Sc of the ground electrode body 31c to the point P1 in the first direction D1. Let L4 denote the length in the first direction D1 from the outer surface 31Sc of the ground electrode body 31c to the ends E3 and E4 of the side portion SSc in the first direction D1.

As with the first embodiment, the ground electrode 30c according to the second embodiment satisfies 0.1 mm≤L3≤0.4 mm, 0.4≤(L2/L1)≤0.8, and 1.4 mm≤L1≤1.7 mm. Accordingly, peeling of the ground electrode tip 39c can be suppressed. As a result, the durability of the spark plug can be improved. More preferably, the length L4 is 0.05 mm or larger. In this case, peeling of the ground electrode tip 39c can be further suppressed, and the durability of the spark plug can be further improved.

F. Third Embodiment

Figure 6A:
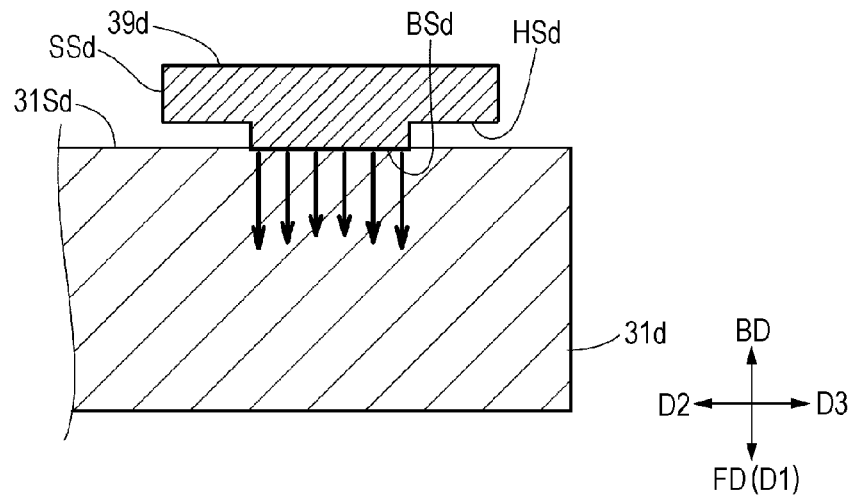
FIGS. 6(A) and 6(B) illustrate a ground electrode 30d.
Figure 6B:
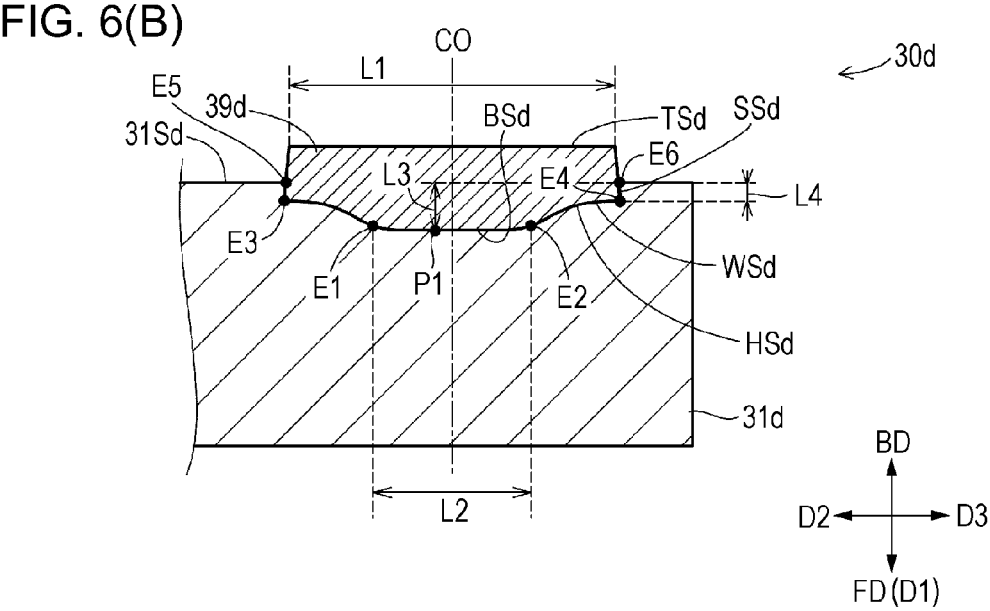

FIG. 6 illustrates a ground electrode 30d of a spark plug according to a third embodiment. FIG. 6(A) illustrates a ground electrode tip 39d and a ground electrode body 31d before welding. FIG. 6(B) illustrates the ground electrode 30d after welding, that is, the ground electrode 30d and the ground electrode body 31d after welding. FIGS. 6(A) and 6(B) each illustrate a specific sectional plane of the ground electrode 30d, which is one of sectional planes that perpendicularly cut a discharge surface TSd and which cuts the discharge surface TSd so that the linear length of the discharge surface TSd is largest.

In the third embodiment, as illustrated in FIG. 6(A), the ground electrode tip 39d before welding has a stepped shape in which a flat portion BSd protrudes from a non-flat portion HSd, in contrast to the first embodiment. Therefore, as illustrated in FIG. 6(B), in the specific sectional plane, a non-flat portion HSd of the ground electrode tip 39d after welding has a curved shape that is upwardly convex in FIG. 6(B), in contrast to a linear shape in the first embodiment.

As with the first embodiment, in the third embodiment, in the specific sectional plane of FIG. 6(B), in the non-flat portion HSd in the second direction D2 from (on the left side of) the point E1, the distance between a welding surface WSd and the discharge surface TSd in the first direction D1 continuously decreases in the second direction D2. In the specific sectional plane of FIG. 6(B), in the non-flat portion HSd in the third direction D3 from (on the right side of) the point E2, the distance between the welding surface WSd and the discharge surface TSd in the first direction D1 continuously decreases in the third direction D3.

As with the first embodiment, in the specific sectional plane according to the third embodiment, the welding surface WSd, where the ground electrode tip 39d is welded to the ground electrode body 31d, includes a side portion SSd between a point E5 and a point E3, a side portion SSd between a point E6 and a point E4, a non-flat portion HSd between a point E1 and the point E3, a non-flat portion HSd between a point E2 and the point E4, and a flat portion BSd between the point E1 and the point E2. As with FIG. 2(B), in the specific sectional plane of FIG. 6(B), let L1 denote the linear length of the discharge surface TSd. Let L2 denote the length of the flat portion BSd in the second direction D2. Let L3 denote the length from an outer surface 31Sd of the ground electrode body 31d to the point P1 in the first direction D1. Let L4 denote the length in the first direction D1 from the outer surface 31Sd of the ground electrode body 31d to the ends E3 and E4 of the side portion SSd in the first direction D1.

As with the first embodiment, the ground electrode 30d according to the third embodiment satisfies 0.1 mm≤L3≤0.4 mm, 0.4≤(L2/L1)≤0.8, and 1.4 mm≤L1≤1.7 mm. Accordingly, peeling of the ground electrode tip 39d can be suppressed. As a result, the durability of the spark plug can be improved. More preferably, the length L4 is 0.05 mm or larger. In this case, peeling of the ground electrode tip 39d can be further suppressed, and the durability of the spark plug can be further improved.

G. Fourth Embodiment

Figure 7:
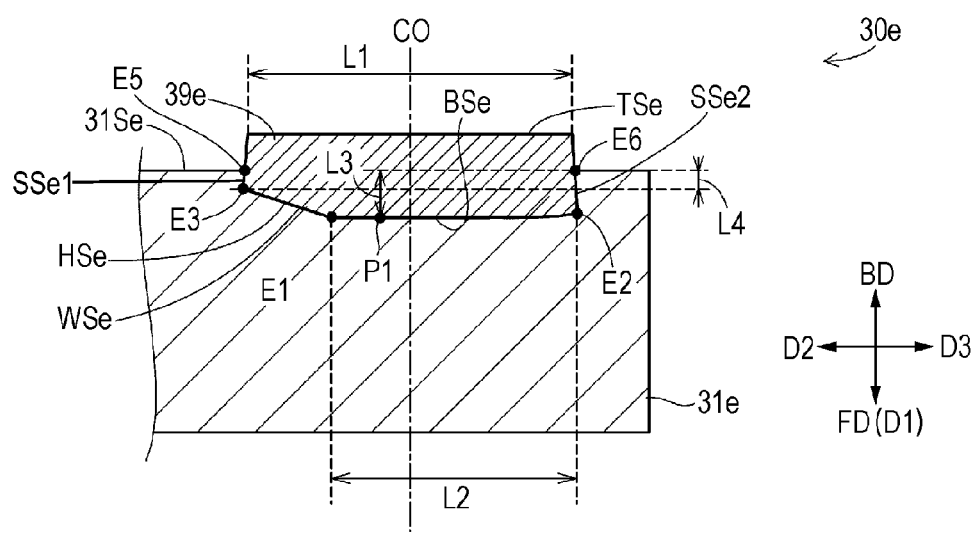
FIG. 7 illustrates a ground electrode 30e.

FIG. 7 illustrates a ground electrode 30e of a spark plug according to a fourth embodiment. FIG. 7 illustrates a specific sectional plane of the ground electrode 30e, which is one of sectional planes that perpendicularly cut the discharge surface TSe and which cuts the discharges surface TSe so that the linear length of the discharge surface TSe is largest.

In the fourth embodiment, as with the first embodiment, in the specific sectional plane of FIG. 7, in a non-flat portion HSe in the second direction D2 from (on the left side of) the point E1, the distance between a welding surface WSe and the discharge surface TSe in the first direction D1 continuously decreases in the second direction D2.

However, in the specific sectional plane of FIG. 7, a non-flat portion does not exist in the third direction D3 from (on the right side of) the point E2, and a region between the point E2 and the point E6 is a side portion SSe2. Accordingly, in the specific sectional plane of FIG. 7, a ground electrode tip 39e is asymmetric about the axis CO.

In the specific sectional plane of FIG. 7, the welding surface WSe, where the ground electrode tip 39e is welded to a ground electrode body 31e, includes a side portion SSe1 between the point E5 and the point E3, a side portion SSe2 between the point E6 and the point E2, a non-flat portion HSe between the point E1 and the point E3, and a flat portion BSe between the point E1 and the point E2. In the specific sectional plane of FIG. 7, let L1 denote the linear length of the discharge surface TSe. Let L2 denote the length of the flat portion BSe in the second direction D2. Let L3 denote the length from an outer surface 31Se of the ground electrode body 31e to the point P1 in the first direction D1. Let L4 denote the length in the first direction D1 from the outer surface 31Se of the ground electrode body 31e to the end E3 of the side portion SSe1 in the first direction D1.

As with the first embodiment, the ground electrode 30e according to the fourth embodiment satisfies 0.1 mm≤L3≤0.4 mm, 0.4≤(L2/L1)≤0.8, and 1.4 mm≤L1≤1.7 mm. Accordingly, peeling of the ground electrode tip 39e can be suppressed. As a result, the durability of the spark plug can be improved. More preferably, the length L4 is 0.05 mm or larger. In this case, peeling of the ground electrode tip 39e can be further suppressed, and the durability of the spark plug can be further improved.

H. Fifth Embodiment

Figure 8A:
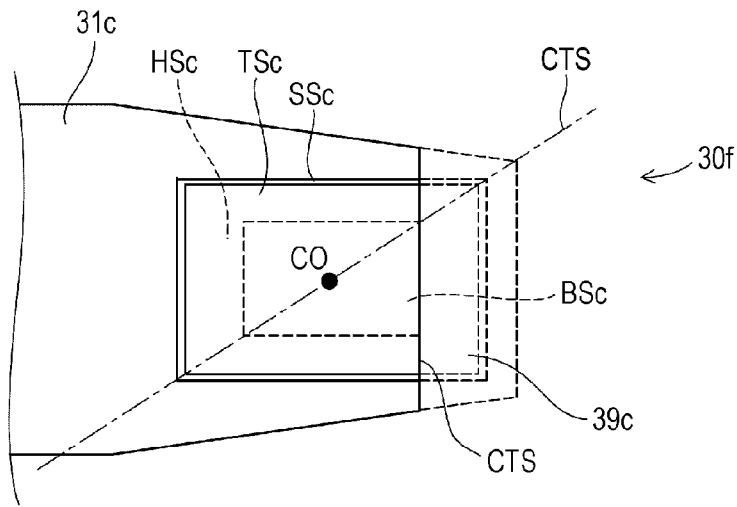
FIGS. 8(A) and 8(B) illustrate a ground electrode 30f.
Figure 8B:
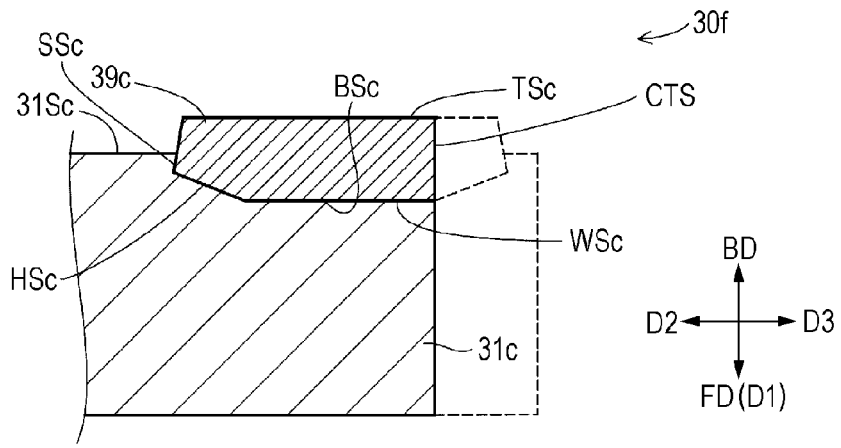

FIG. 8 illustrates a ground electrode 30f of a spark plug according to a fifth embodiment. FIG. 8(A) illustrates the ground electrode 30f, as viewed in the first direction D1 along the axis CO from a position in a direction opposite to the first direction D1 from the ground electrode 30f. As illustrated in FIGS. 8(A) and 8(B), the ground electrode 30f is made through a cutting step of cutting the ground electrode 30c (FIG. 5) according to the second embodiment along a sectional plane CTS, which is parallel to the axis CO. The sectional plane CTS is a sectional plane that includes both of the ground electrode body 31c and a part of the ground electrode tip 39c after the joining step. The ground electrode body 31c and the ground electrode tip 39c, which have been joined to each other, are cut along the sectional plane CTS, so that a part of the ground electrode body 31c and the ground electrode tip 39c are removed. Broken lines in FIGS. 8(A) and 8(B) represent a part of the ground electrode body 31c and the ground electrode tip 39c, which are removed in the cutting step.

As described above, the ground electrode 30f before the cutting step (that is, the ground electrode 30c according to the second embodiment) satisfies 0.1 mm≤L3≤0.4 mm, 0.4≤(L2/L1)≤0.8, and 1.4 mm≤L1≤1.7 mm. Accordingly, peeling of the ground electrode tip 39c can be suppressed, because the welding surface WSc has a sufficient joint strength in the ground electrode 30f even after the cutting step. As a result, the durability of the spark plug can be improved. Note that it is not necessary that the ground electrode 30f after the cutting step satisfy the aforementioned conditions on L1 to L3.

D. Modifications (1) In the embodiments described above, the ground electrode 30 and the center electrode 20 face each other in the direction of the axis CO of the spark plug 100 and form a gap for causing a spark discharge. In other words, the direction of the axis CO is parallel to the first direction D1. Instead, the ground electrode 30 and the center electrode 20 may face each other in a direction perpendicular to the axis CO and form a gap for causing a spark discharge. In other words, the direction of the axis CO may be perpendicular to the first direction D1.

(2) It is considered that the improvement of the durability of the spark plug 100 of each of the embodiments described above is achieved by setting the parameters L1 to L4 to be in the aforementioned ranges. Accordingly, elements other than these parameters, such as the materials of the metallic shell 50, the ground electrode tip 39, the ground electrode body 31, the center electrode 20, and the insulator 10, can be changed in various ways. The dimensions of the details of the metallic shell 50, the center electrode 20, and the insulator 10 can be changed in various ways. For example, the material of the metallic shell 50 may be low-carbon steel that is zinc plated or nickel plated, or may be low-carbon steel that is not plated. The material of the insulator 10 may be any insulating ceramics other than alumina. It is not necessary that the ground electrode body 31 include the core 31D.

Heretofore, the present invention has been described on the basis of the embodiments and the modifications. However, the embodiments, which are described for ease of understanding the present invention, do not limit the present invention. The present invention can be changed or modified within the sprit and the scope of the claims, and the equivalents thereof are included in the present invention.

REFERENCE SIGNS LIST

5: gasket
6: ring member
8: plate packing

9: talc
10: insulator
12: through-hole
13: elongated leg
15: stepped portion
16: stepped portion
17: distal body
18: proximal body
19: flange
20: center electrode
21: center electrode body
21A: electrode base
21B: core
23: head
24: flange
25: leg
27: fusion zone
29: center electrode tip
30: ground electrode
31: ground electrode body
39: ground electrode tip
40: terminal
41: cap attachment portion
42: flange
43: leg
50: metallic shell
50A: distal end surface
51: tool engagement portion
52: threaded portion
53: crimping portion
54: seating portion
56: stepped portion
58: compressive deformation portion
59: insertion hole
60: electroconductive seal
70: resistor
80: electroconductive seal
100: spark plug Having described the invention, the following is claimed:

1. A spark plug comprising: a center electrode, a ground electrode body, and an electrode tip that is resistance welded to the ground electrode body and that has a discharge surface that forms a gap between the discharge surface and the center electrode,
wherein, in a specific sectional plane, which is one of sectional planes that perpendicularly cut the discharge surface and which cuts the discharge surface so that a linear length of the discharge surface is largest,
when a first direction is defined as a direction that is perpendicular to the discharge surface and in which the ground electrode body is located as viewed from the discharge surface and a point P1 is defined as one of points on a welding surface of the electrode tip where the electrode tip is welded to the ground electrode body, the one of the points being farthest from the discharge surface,
the welding surface is located in the first direction from an outer surface of the ground electrode body, and
the welding surface includes a flat portion whose distance to the point P1 in the first direction is 0.05 mm or smaller, and
when a point E1 and a point E2 are defined as ends of the flat portion and a second direction is defined as a direction from the point E2 toward the point E1,
in the second direction from the point E1, a distance between the welding surface and the discharge surface in the first direction is smaller than a distance between the discharge surface and the point E1 in the first direction, and
a linear length L1 of the discharge surface, a length L2 of the flat portion in the second direction, and a length L3 from the outer surface of the ground electrode body to the point P1 in the first direction satisfy $1.4$ mm$\leq L1 \leq 1.7$ mm, $0.4 \leq (L2/L1) \leq 0.8$, and $0.1$ mm$\leq L3 \leq 0.4$ mm.

2. The spark plug according to claim 1,
wherein, in the specific sectional plane, the welding surface includes a side portion that has an acute angle of 20 degrees or smaller with respect to the first direction, and
wherein a length L4 in the first direction from the outer surface of the ground electrode body to an end of the side portion in the first direction is 0.05 mm or larger.

3. A method of making a spark plug including a center electrode, a ground electrode body, and an electrode tip that is resistance welded to the ground electrode body and that has a discharge surface that forms a gap between the discharge surface and the center electrode, the method comprising:
a joining step of resistance welding the electrode tip to the ground electrode body,
wherein, in a specific sectional plane, which is one of sectional planes that perpendicularly cut the discharge surface of the electrode tip after the joining step and which cuts the discharge surface so that a linear length of the discharge surface is largest,
when a first direction is defined as a direction that is perpendicular to the discharge surface and in which the ground electrode body is located as viewed from the discharge surface and a point P1 is defined as one of points on a welding surface of the electrode tip where the electrode tip is welded to the ground electrode body, the one of the points being farthest from the discharge surface,
the welding surface is located in the first direction from an outer surface of the ground electrode body, and
the welding surface includes a flat portion whose distance to the point P1 in the first direction is 0.05 mm or smaller, and
when a point E1 and a point E2 are defined as ends of the flat portion and a second direction is defined as a direction from the point E2 toward the point E1, in the second direction from the point E1, a distance between the welding surface and the discharge surface in the first direction is smaller than a distance between the discharge surface and the point E1 in the first direction, and
a linear length L1 of the discharge surface, a length L2 of the flat portion in the second direction, and a length L3 from the outer surface of the ground electrode body to the point P1 in the first direction satisfy $1.4$ mm$\leq L1 \leq 1.7$ mm, $0.4 \leq (L2/L1) \leq 0.8$, and $0.1$ mm$\leq L3 \leq 0.4$ mm.

4. The method of making a spark plug according to claim 3, further comprising:
a step of removing, after the joining step, a part of the electrode tip and a part of the ground electrode body by cutting the electrode tip and the ground electrode body along a sectional plane passing through both of the ground electrode body and the electrode tip joined to the ground electrode body.

* * * * *